United States Patent
Schiffmann et al.

(10) Patent No.: US 7,706,978 B2
(45) Date of Patent: Apr. 27, 2010

(54) METHOD FOR ESTIMATING UNKNOWN PARAMETERS FOR A VEHICLE OBJECT DETECTION SYSTEM

(75) Inventors: Jan K. Schiffmann, Newbury Park, CA (US); David A. Schwartz, Moorpark, CA (US)

(73) Assignee: Delphi Technologies, Inc., Troy, MI (US)

( * ) Notice: Subject to any disclaimer, the term of this patent is extended or adjusted under 35 U.S.C. 154(b) by 983 days.

(21) Appl. No.: 11/219,207

(22) Filed: Sep. 2, 2005

(65) Prior Publication Data

US 2007/0055446 A1   Mar. 8, 2007

(51) Int. Cl.
G08G 1/16 (2006.01)
(52) U.S. Cl. ............... 701/301; 701/17; 701/93; 701/200; 701/223; 342/5; 342/13; 342/25 A; 342/70; 342/73; 342/96; 342/66; 342/69; 342/165; 342/184; 342/185; 342/197; 340/436; 340/903
(58) Field of Classification Search ......... 701/301, 701/17, 93, 200, 223; 342/5, 13, 25 A, 70, 342/73, 96, 66, 69, 165, 184, 185, 197; 340/436, 340/903
See application file for complete search history.

(56) References Cited

U.S. PATENT DOCUMENTS

| | | | |
|---|---|---|---|
| 3,946,382 A * | 3/1976 | Kossiakoff et al. ............ 342/93 |
| 4,068,233 A * | 1/1978 | Pease et al. .................... 342/94 |
| 4,128,838 A * | 12/1978 | Brands et al. ................ 342/185 |
| 4,274,095 A * | 6/1981 | Phipps et al. .................. 342/93 |
| 4,336,539 A * | 6/1982 | Hendrickson ................ 342/55 |
| 4,443,797 A * | 4/1984 | Cramp et al. ............... 342/185 |
| 4,516,125 A * | 5/1985 | Schwab et al. ................ 342/36 |
| 4,845,501 A * | 7/1989 | Pease et al. ................. 342/185 |
| 5,418,535 A * | 5/1995 | Masucci et al. ............. 342/185 |
| 5,519,401 A * | 5/1996 | Farmer et al. ............... 342/185 |
| 5,596,327 A * | 1/1997 | Mills et al. .................. 342/195 |
| 5,867,121 A * | 2/1999 | Erickson et al. ............. 342/185 |
| 6,087,982 A * | 7/2000 | Liu ............................ 342/185 |
| 6,580,385 B1 * | 6/2003 | Winner et al. ................ 342/70 |
| 6,771,208 B2 * | 8/2004 | Lutter et al. .................. 342/52 |
| 6,873,251 B2 * | 3/2005 | Schiffmann et al. ......... 340/436 |
| 6,900,754 B2 * | 5/2005 | Ono et al. .................... 342/158 |
| 7,263,209 B2 * | 8/2007 | Camus et al. ............... 382/104 |
| 7,522,747 B2 * | 4/2009 | Horibe ........................ 382/104 |
| 2002/0060640 A1 * | 5/2002 | Davis et al. ................. 342/104 |
| 2002/0072869 A1 | 6/2002 | Stiller |
| 2002/0167589 A1 * | 11/2002 | Schofield et al. ............ 348/148 |
| 2003/0011509 A1 * | 1/2003 | Honda ......................... 342/70 |
| 2003/0088361 A1 * | 5/2003 | Sekiguchi .................... 701/301 |

(Continued)

*Primary Examiner*—Khoi Tran
*Assistant Examiner*—Jorge O Peche
(74) *Attorney, Agent, or Firm*—Thomas N. Twomey

(57) ABSTRACT

A method for estimating unknown parameters (pan angle ($\psi$), instantaneous tilt angle ($\tau$) and road geometry of an upcoming road segment) for a vehicle object detection system. The vehicle object detection system is preferably a forward looking, radar-cued vision system having a camera, a radar sensor and an processing unit. The method first estimates the pan angle ($\psi$), then corrects the coordinates from a radar track so that pan angle ($\psi$) can be treated as zero, and finally solves a least squares problem that determines best estimates for instantaneous tilt angle ($\tau$) and road geometry. Estimating these parameters enables the vehicle object detection system to identify, interpret and locate objects in a more accurate and efficient manner.

12 Claims, 4 Drawing Sheets

U.S. PATENT DOCUMENTS

| | | | |
|---|---|---|---|
| 2003/0187578 A1* | 10/2003 | Nishira et al. | 701/301 |
| 2003/0201929 A1* | 10/2003 | Lutter et al. | 342/52 |
| 2004/0012516 A1 | 1/2004 | Schiffmann et al. | |
| 2004/0054473 A1* | 3/2004 | Shimomura | 701/301 |
| 2004/0151345 A1* | 8/2004 | Morcom | 382/104 |
| 2004/0183712 A1* | 9/2004 | Levitan et al. | 342/22 |
| 2004/0246471 A1* | 12/2004 | Matsuura et al. | 356/141.4 |
| 2005/0004762 A1* | 1/2005 | Takahama et al. | 701/301 |
| 2005/0099433 A1* | 5/2005 | Berson et al. | 345/619 |
| 2005/0146458 A1* | 7/2005 | Carmichael et al. | 342/52 |
| 2005/0187713 A1* | 8/2005 | Yamamura et al. | 701/301 |
| 2005/0219530 A1* | 10/2005 | Horibe et al. | 356/399 |
| 2005/0228588 A1* | 10/2005 | Braeuchle et al. | 701/301 |

* cited by examiner

METHOD FOR ESTIMATING UNKNOWN PARAMETERS FOR A VEHICLE OBJECT DETECTION SYSTEM

TECHNICAL FIELD

The present invention relates to a method for estimating unknown parameters in a vehicle object detection system, and more particularly, to a method for estimating camera pan and tilt angles and the geometry of an upcoming road segment.

BACKGROUND OF THE INVENTION

Various types of object detection systems for motor vehicles have been developed which utilize one or more sensors to identify, interpret and/or locate objects surrounding the vehicle. Examples of such systems include forward looking systems (FLS), rear detection systems (RDS), and side detection systems (SDS).

Some FLSs are referred to as "vision-only systems," in that they only utilize cameras and not radar, laser or other types of sensors. In the case of single camera vision systems (referred to as "monocular vision systems") and multiple camera vision systems (referred to as "stereo vision system") a processing unit usually has to estimate the pan and tilt angles of a camera, as well as the vertical curvature of an upcoming road segment in order to accurately interpret and locate detected objects. One way in which these estimates can be performed is by using optical flow techniques in which a focus of expansion is found in the image. These techniques, however, require a significant amount of computations and frequently do not produce robust, accurate estimates.

Another type of object detection system is referred to as a "radar-cued vision system", which broadly includes all object detection systems that utilize both radar sensors and cameras to identify, interpret and/or locate objects. A typical forward looking, radar-cued vision system for a vehicle includes a radar sensor and one or more cameras directed generally in front of the vehicle. The radar sensor initially detects an object so that a region of the camera image in which the object is likely to be found can be identified, narrowed in on, and analyzed in more detail.

SUMMARY OF THE INVENTION

According to one aspect of the invention, there is provided a method for estimating unknown parameters for a vehicle object detection system. This method includes the steps of generating one or more vision and radar tracks, generating one or more matched pairs from the vision and radar tracks, and estimating a camera pan angle ($\psi$), an instantaneous tilt angle ($\tau$) and/or the road geometry, wherein the estimates minimize the alignment error between the matched pair.

According to another aspect, an estimate of the camera pan angle is first solved, and then one or more radar tracks are pan corrected using the estimated camera pan angle; effectively setting the camera pan angle equal to zero. Using the pan corrected matched vision and radar tracks (pan corrected matched pairs), the tilt angle ($\tau$) and/or road geometry is subsequently solved for the reduced optimization problem.

According to yet another aspect, the non-linear optimization problem is further simplified by linearization about the predicted values of the parameters. Furthermore, a least squares error criterion is chosen for the optimization metric resulting in a linear least squares problem that can be efficiently solved.

Objects, features and advantages of this invention include, but are certainly not limited to, providing more accurate and efficient pan angle, instantaneous tilt angle and vertical curvature estimates for a vehicle object detection system.

BRIEF DESCRIPTION OF THE DRAWINGS

These and other objects, features and advantages of this invention will be apparent from the following detailed description of the preferred embodiments and best mode, the appended claims and the accompanying drawings, in which:

DETAILED DESCRIPTION OF THE INVENTION

The present method for estimating unknown parameters can be used with a number of different types of vehicle object detection systems, but is particularly well suited for use with forward looking, radar-cued vision systems (both monocular and stereo vision systems). Accordingly, the following description of the preferred embodiment is provided in the context of a forward looking, radar-cued vision system, even though the method of the present invention could be used with other types of object detection systems.

Figure 1:
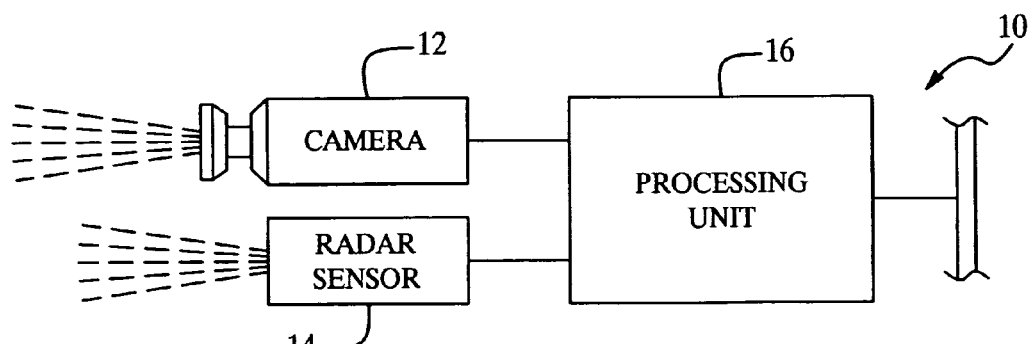
FIG. 1 is a block diagram of an exemplary object detection system that utilizes the method of the present invention.

With reference to FIG. 1, there is shown a vehicle object detection system 10 of the forward looking, radar-cued monocular vision type that generally includes a camera 12, a radar sensor 14 and a processing unit 16 connected to the camera and the radar sensor. Of course, system 10 could include one of any number of additional components and could be connected to other systems, devices, networks, etc., such as a warning indicator on a vehicle instrument panel, a vehicle braking system and a vehicle airbag system, to name but a few.

Camera 12 is mounted on a host vehicle 20 and is preferably pointed in a generally forward direction such that it captures a camera image of an area in front of the vehicle. Typically, camera 12 is mounted within the passenger compartment, such as near the rearview mirror, but could alternatively be mounted at other suitable locations inside and outside of the passenger compartment. Each object that is detected within the camera image gives rise to a collection of data referred to as a vision track. A "vision track" is broadly defined as a collection of data that is derived from a camera image and provides information on the position and/or other features of an object. Preferably, each vision track is provided in the form of pixel coordinates (p, q), which use a two-dimensional Cartesian coordinate system. A captured camera image is periodically sent by camera 12 to processing unit 16 so that corresponding vision tracks can be obtained.

Radar sensor 14 is mounted on host vehicle 20 and pans back and forth across a predetermined angular range generally in front of the vehicle. Radar sensor 14 is commonly mounted outside of the passenger compartment, such as near the vehicle grille, but could be mounted at any other appropriate location inside or outside of the passenger compartment. Radar sensor 14 emits a generally narrow fan-shaped radar beam so that objects generally in front of the vehicle reflect the emitted radar back to the sensor. The radar reflections received by radar sensor 14 are sent to processing unit 16 so that corresponding radar tracks can be obtained. A "radar track" is broadly defined as a collection of data that is derived from radar reflections and provides information on the position and/or other features of an object. Preferably, each radar track is provided in the form of range and azimuth angle coordinates $(R, \theta)$, which use a two-dimensional Polar coordinate system.

The vision and radar tracks use different coordinate systems and therefore require a method for accurate translation. The image coordinates $(p, q)$ represent a perspective transformation of three-dimensional world Cartesian coordinates into a two-dimensional Cartesian coordinate space, while the radar coordinates $(R, \theta)$ represent a two-dimensional subset of the three-dimensional world polar coordinates. Inverting the perspective transformations of the image and radar coordinates to recover the three-dimensional world coordinates, requires knowledge of extrinsic camera parameters and additional world information or constraints. For example, a point in the two-dimensional image maps to a line in the three-dimensional world coordinates. The additional world information or constraints, which includes but is not limited to the vertical curvature of an upcoming road segment, is broadly represented here as the "road geometry." One method for solving the correspondence between the pixel coordinates $(p, q)$ of the vision track and the range and azimuth angle coordinates $(R, \theta)$ of the radar track, will be subsequently described.

Figure 2:
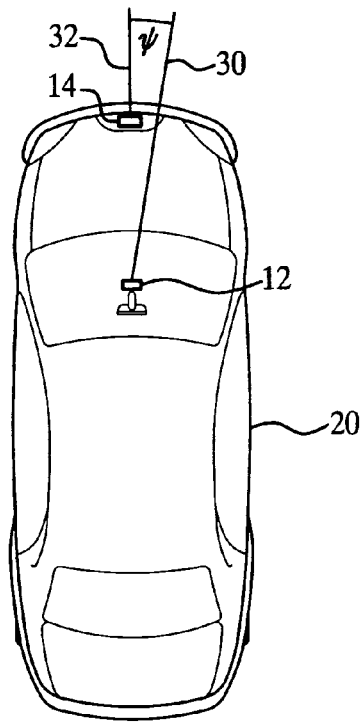
FIG. 2 is a schematic plan view of a vehicle demonstrating a camera pan angle ($\psi$)
Figure 3:
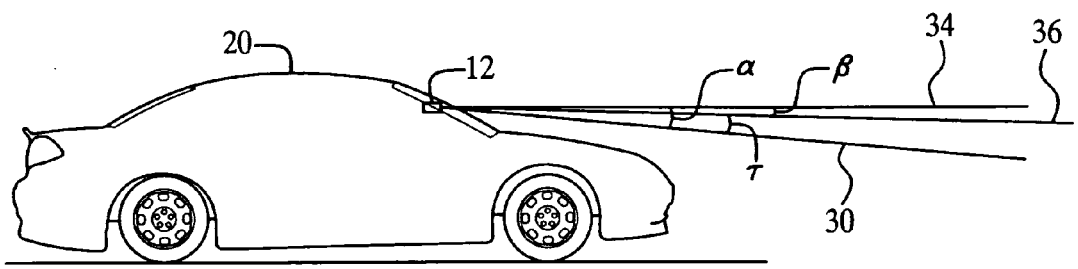
FIG. 3 is schematic elevation view of the vehicle of FIG. 2 demonstrating various camera tilt angles ($\gamma$, $\beta$, $\tau$)

Processing unit 16 receives the camera and radar data from camera 12 and radar sensor 14, respectively, and executes a set of instructions for obtaining the vision and radar tracks and for estimating the unknown parameters pan angle, tilt angle and road geometry. Preferably, unit 16 includes a digital microprocessor and a set of firmware instructions stored on a digital memory device, however, other types of electronic processing devices, memory devices and software could be used as well. The firmware can include a number of additional instructions, such as those used for identifying, interpreting and/or locating objects. In that regard, the present method for estimating unknown parameters is only one sub-set of a larger set of firmware instructions likely to be executed by processing unit 16. Once an object is detected, interpreted and/or located, a warning signal can be sent by unit 16 to the appropriate network, device, system, etc. so that a proper response can be determined. For more information on various aspects of vehicle object detection systems, please see U.S. Pat. Nos. 6,873,251, 6,794,987 and 6,615,138, which are assigned to the present assignee and are incorporated herein by reference. Turning now to FIGS. 2 and 3, explanations of the camera pan and tilt angles are provided in greater detail.

The pan angle ($\psi$) of camera 12 is broadly defined as the horizontal angle between a camera boresight 30 and a radar boresight 32. Horizontal misalignment between the camera and radar boresights 30, 32 leads to pan angle ($\psi$) and can be caused by a number of factors, but is mainly attributable to the difficulty associated with mounting these two devices such that they are perfectly aligned. In the event that the camera and radar boresights 30, 32 are perfectly aligned (no misalignment), the pan angle ($\psi$) would=0°.

The various tilt angles of camera 12 are shown in FIG. 3 and generally refer to the vertical misalignment between the camera boresight 30 and some other frame of reference. For instance, the nominal tilt angle ($\alpha$) of the camera is generally defined as the vertical or "look down" angle between camera boresight 30 and a longitudinal axis 34 of the vehicle. The pitch angle ($\beta$) of the vehicle is generally defined as the vertical angle between the longitudinal axis 34 of the vehicle and a line 36 which is representative of the local slope under the vehicle; that is, line 36 is representative of the longitudinal axis of a planar ground patch under the vehicle. Thus, in the case where host vehicle 20 (and hence horizontal axis 34) is perfectly level with the ground patch under the vehicle, the pitch angle ($\beta$) of the vehicle is 0°. When the host vehicle accelerates and the rear end of the vehicle drops (as represented in FIG. 3), the pitch angle ($\beta$) becomes a larger, positive value. The instantaneous tilt angle ($\tau$) of the camera is broadly defined as the vertical angle between camera boresight 30 and line 36, and is the superposition of the camera nominal tilt angle ($\alpha$) and the vehicle pitch angle ($\beta$). The various tilt angles described above can be affected by a number of different events, including vehicle pitching which can occur when the vehicle drives over bumps or experiences substantial acceleration or deceleration.

The landscape seen in the field-of-view of vehicle object detection system 10, which is mostly of an upcoming road segment, may have an arbitrary geometry that can be approximated using a parameterized road geometry model. For example, the height z of the road surface may be modeled as a function of the down-range and cross-range coordinates x and y in a world Cartesian coordinate system, as in $$z = h(x, y, P), \tag{Eqn. 1}$$

where P represents a finite collection of parameters. Suitable adjustment of the values of parameters P allows for the approximation of arbitrary road scene geometries. The accuracy of such approximations depends on the complexity of the true road scene geometry, the complexity of the function h, and the number of parameters in P.

One possible choice for such a model is the constant vertical curvature model which assumes that, in side-view, the upcoming road geometry looks like a section of a circle. In this model, the road height z is a function solely of the down-range distance x and a vertical curvature parameter c, i.e., $z=h(x,c)$. More specifically, a further approximation of the circular shape yields the model $$z = -\frac{1}{2}cx^2 \tag{Eqn. 2}$$

Knowing the pan angle ($\psi$), the instantaneous tilt angle ($\tau$) and the road geometry of the upcoming road segment can greatly improve the cost and time efficiency of image processing. That is, knowledge of these parameters provides a more accurate estimate of where to look in the camera image when an object has been detected in the radar image. When an object is initially detected in the radar image, instead of reviewing the entire camera image (a computationally exhaustive process), processing unit 16 selects certain sub-regions of the overall camera image that are most likely to contain the detected object. The larger the selected sub-regions, the more computational analysis that is required. Thus, it is advantageous to reduce the size of the selected camera image sub-regions, and one way to do so is by increasing the accuracy of the estimated pan angle ($\psi$), instantaneous tilt angle ($\tau$) and the road geometry, as is appreciated by those skilled in the art. Inaccurate pan angle estimates can result in larger uncertainty as to the horizontal position of the vehicle, and inaccurate tilt angle estimates can make an object appear closer or further than it really is. By increasing the accuracy of the pan angle, tilt angle and road geometry estimates, the uncertainty of the position of a detected object is decreased which results in a smaller camera image sub-region to be searched.

Figure 4:
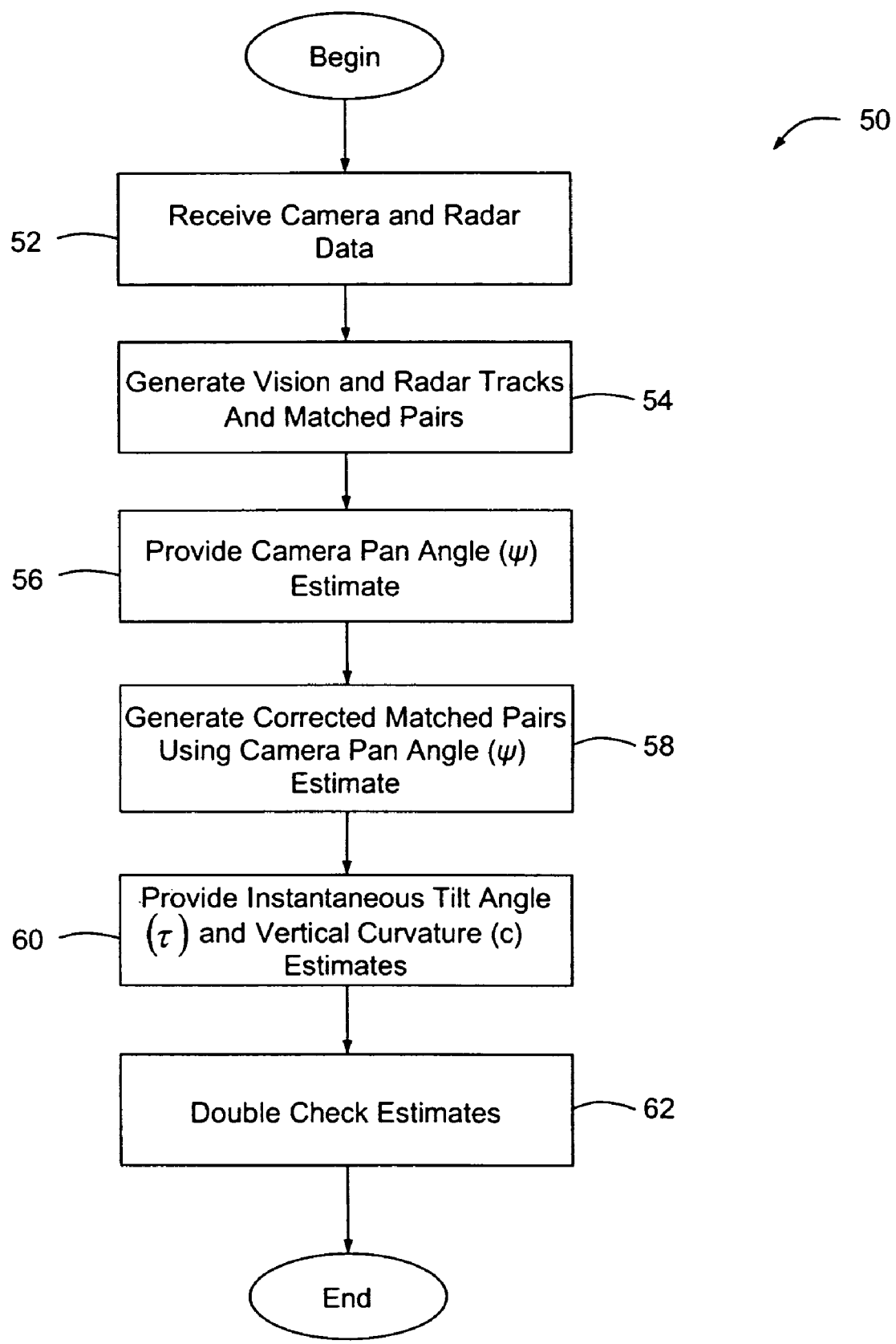
FIG. 4 is a flowchart illustrating an exemplary embodiment overview of a method for estimating unknown parameters for a vehicle object detection system.

Turning now to FIG. 4, there is shown a preferred embodiment of a method 50 for estimating unknown parameters for a vehicle object detection system. Broadly speaking, method 50 simplifies a number of non-linear equations in order to provide a best estimate for the unknown camera pan angle ($\psi$), camera instantaneous tilt angle ($\tau$) and road geometry, which in this particular embodiment is the vertical curvature (c) of the upcoming road segment. In order to estimate all three unknown parameters, then at least two objects must be mutually detected by camera 12 and radar sensor 14. Of course, the more objects that are detected, the more accurate the corresponding estimates.

Beginning with step 52, processing unit 16 receives camera and radar data from camera 12 and radar sensor 14, respectively. The processing unit reviews the camera image and creates a vision track (pixel coordinates (p, q)) for each object that is detected from the image. Likewise, a similar process is performed for the radar data such that a radar track (range and azimuth angle coordinates (R, θ)) is created for each detected object. Because this particular embodiment is a radar-cued vision system, the objects detected in the camera data are a sub-set of those detected in the radar data. Thus, each vision track has a corresponding radar track that relates to the same detected object and can be used to make a matched pair, step 54. A "matched pair" is broadly defined as a pair of vision and radar tracks where each track generally relates to the location of the same object. Once one or more matched pairs have been obtained, a pan angle can be estimated.

Figure 5:
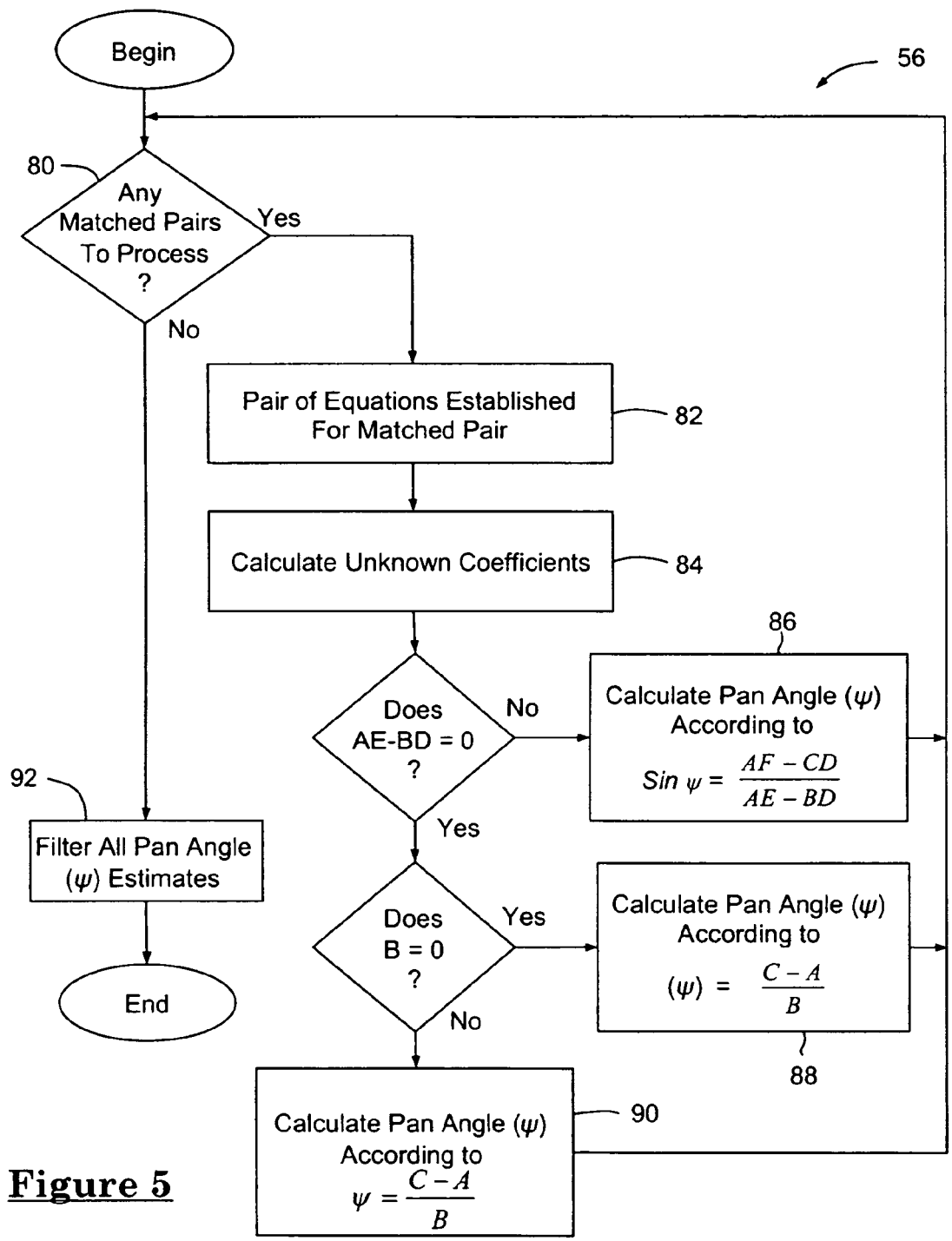
FIG. 5 is a more detailed flowchart illustrating an exemplary embodiment of a method for estimating a pan angle, which is preferably a step in the method shown in the flowchart of FIG. 4.

Step 56 provides a pan angle ($\psi$) estimate that best fits the set of previously obtained matched pairs and does so independently of the instantaneous tilt angle ($\tau$) and vertical curvature (c). Turning now to FIG. 5 where a more detailed description of step 56 is provided, the procedure begins by checking to see if there are any matched pairs to process, step 80. Assuming that the answer to the preceding step was yes, step 82 sets up a pair of equations for each matched pair of coordinates. In order to relate the matched pair's radar track coordinates (x, y) with its vision track coordinates (p, q), the present method solves simultaneous nonlinear equations obtained by substituting the radar-derived object coordinates into the perspective transformation, as constrained by the selected road geometry model. According to a preferred embodiment, a simplified road geometry model of a flat world, c=0, is used. Next, a pan angle ($\psi$) is calculated that best satisfies those equations.

$$[(q-q_0)x \cos\tau - fy] \cos\psi + [(q-q_0)y \cos\tau - fx] \sin\psi = -(q-q_0)(z+h)\sin\tau \quad \text{(Eqn. 3)}$$

$$[(p-p_0)x \cos\tau + fx \sin\tau] \cos\psi + [(p-p_0)y \cos\tau + fy \sin\tau] \sin\psi = f(z+h)\cos\tau - (p-p_0)(z+h)\sin\tau \quad \text{(Eqn. 4)}$$

Equations 3 and 4 provide a mechanism for relating the coordinates of the radar track to those of the vision track for each matched pair. Equations 3 and 4 are in the form:

$$A \cos\psi + B \sin\psi = C \quad \text{(Eqn. 5)}$$

$$D \cos\psi + E \sin\psi = F \quad \text{(Eqn. 6)}$$

Coefficients A, B, C, D, E and F should be calculated, step 84. Because the estimated pan angle is relatively insensitive to the value assumed for r, either a nominal value or the current estimate for long-term tilt angle can be used during the solution of the following equations. If AE−BD≠0, then the pan angle can be estimated using the following equation, step 86.

$$\sin\psi = \frac{AF - CD}{AE - BD} \quad \text{(Eqn. 7)}$$

If AE−BD=0, it means the two equations are not linearly independent. Using a small angle approximation (cos $\psi \approx 1$) and if B≠0, then the pan angle can be estimated using the next equation, step 88.

$$\psi = \frac{C - A}{B} \quad \text{(Eqn. 8)}$$

In the case where AE−BD=0 or B=0 or (AF−CD)>(AE−BD) the pan angle estimate using this matched pair can be abandoned and control passes back to step 80. This process continues until there are no more matched pairs to process, at which time step 90 filters all of the raw pan angle estimates to provide a single filtered, pan angle estimate ($\psi$). According to a preferred embodiment, a low-pass filter is used to filter the various pan angle estimates.

Once the camera pan angle ($\psi$) has been estimated, each radar track can be corrected or re-processed with the estimated pan angle so that a set of pan corrected matched pairs, each having a corrected radar track, is generated. Because the corrected radar track information has already been corrected for errors attributable to the pan angle ($\psi$), subsequent estimates for the instantaneous tilt angle ($\tau$) and vertical curvature (c) can simply assume that pan angle ($\psi$)=0, thus simplifying the equations.

Figure 6:
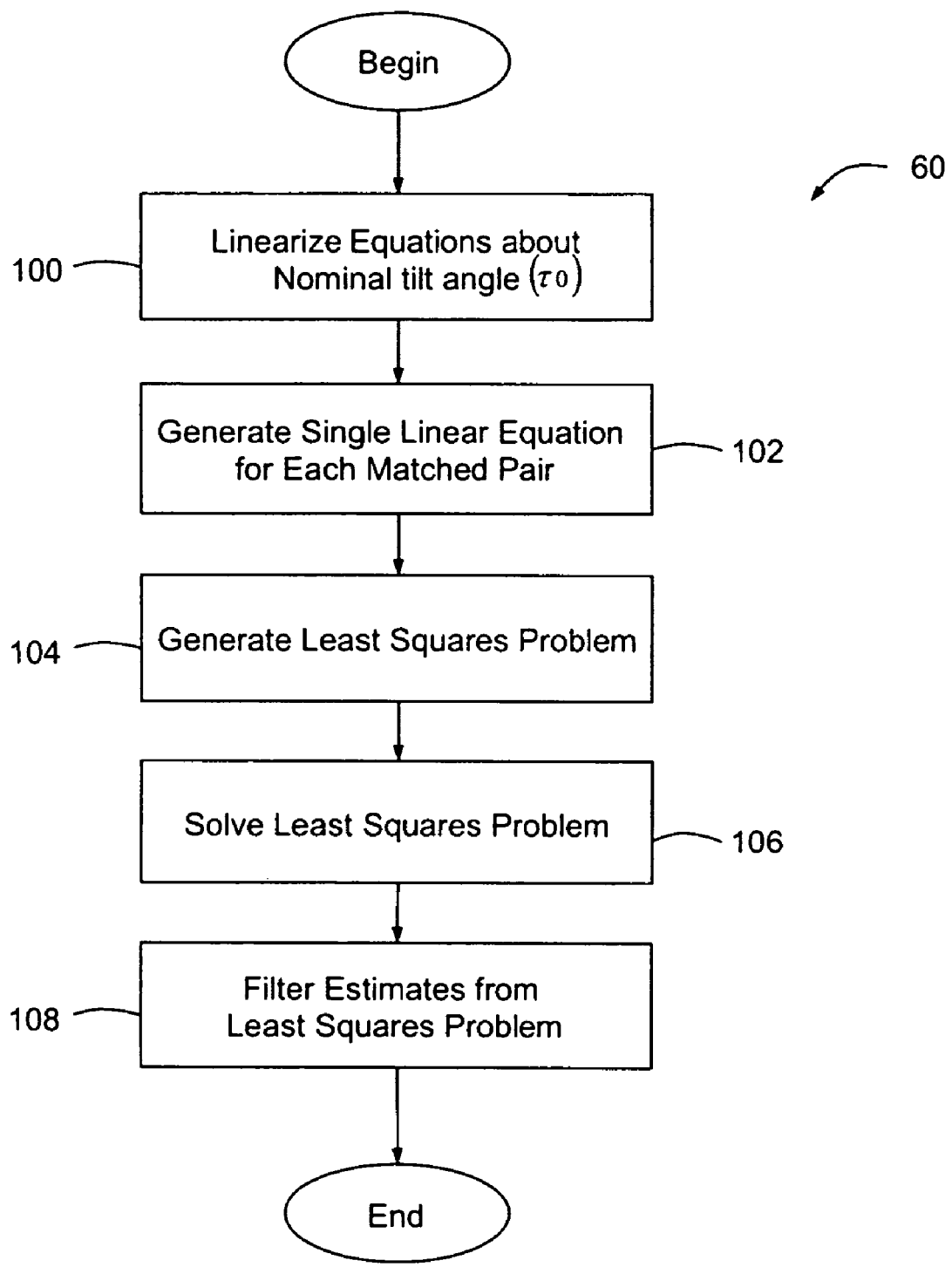
FIG. 6 is a more detailed flowchart illustrating an exemplary embodiment of a method for estimating an instantaneous tilt angle and vertical curvature, which are also preferably steps in the method shown in the flowchart of FIG. 4.

In step 60, a least squares problem is used which includes two unknown coefficients (instantaneous tilt angle $\tau$ and vertical curvature c) and N equations (one equation for each matched pair). Turning now to FIG. 6, a more detailed flowchart describing step 60 is shown. First, from the perspective transformation:

$$x_c = (\cos\psi\cos\tau)x + (\sin\psi\cos\tau)y + \sin\tau\left(h - \frac{1}{2}cx^2\right) \quad \text{(Eqn. 9)}$$

$$z_c = -(\cos\psi\sin\tau)x - (\sin\psi\sin\tau)y + \cos\tau\left(h - \frac{1}{2}cx^2\right) \quad \text{(Eqn. 10)}$$

Next, the following Taylor series are used to linearize Eqns. 9 and 10 about a nominal tilt angle ($\tau_0$), step 100. It is preferable that nominal tilt angle ($\tau_0$) be approximately equal to the true tilt angle.

$$\sin\tau = \sin\tau_0 + \cos\tau_0(\tau - \tau_0) \quad \text{(Eqn. 11)}$$

$$\cos\tau = \cos\tau_0 - \sin\tau_0(\tau - \tau_0) \quad \text{(Eqn. 12)}$$

Step 100 substitutes the Taylor series equations and assumes that the pan angle ($\psi$)=0 (pan corrected radar tracks already take pan angle into account) to convert trigonometric Eqns. 9 and 10 into the following, simpler linear equations. So long as the tilt deviations remain small, this conversion can be accomplished without much loss of accuracy.

$$x_c \approx x\cos\tau_0 - x\sin\tau_0(\tau - \tau_0) + h\sin\tau_0 + \\ h\cos\tau_0(\tau - \tau_0) - \frac{1}{2}cx^2\sin\tau_0 - \frac{1}{2}cx^2\cos\tau_0(\tau - \tau_0)$$ (Eqn. 13)

$$z_c \approx -x\sin\tau_0 - x\cos\tau_0(\tau - \tau_0) + h\cos\tau_0 - \\ h\sin\tau_0(\tau - \tau_0) - \frac{1}{2}cx^2\cos\tau_0 + \frac{1}{2}cx^2\sin\tau_0(\tau - \tau_0)$$ (Eqn. 14)

The terms $$-\frac{1}{2}cx^2\cos\tau_0(\tau - \tau_0)$$

in Eqn. 13 and $$+\frac{1}{2}cx^2\sin\tau_0(\tau - \tau_0)$$

in Eqn. 14 are assumed to be negligible and can be removed. With these terms removed, step 102 manipulates Eqn. 3 by substituting Eqns. 13 and 14 for $x_c$ and $z_c$, respectively, which results in a single linear equation having two unknown coefficients ($\tau$, c) for each matched pair. Once these equations have been generated, a least squares problem can be set up in the following form:

$$[A\ B]\begin{bmatrix}c\\\tau\end{bmatrix} = C$$ (Eqn. 15)

where $$A = -\frac{1}{2}(p - p_0)x^2\sin\tau_0 + \frac{f}{2}x^2\cos\tau_0$$ (Eqn. 16)

$$B = (p - p_0)(h\cos\tau_0 - x\sin\tau_0) + f(x\cos\tau_0 + h\sin\tau_0)$$ (Eqn. 17)

$$C = fx(\tau_0\cos\tau_0 - \sin\tau_0) + fh(\cos\tau_0 + \tau_0\sin\tau_0) - \\ (p - p_0)x(\cos\tau_0 + \tau_0\sin\tau_0) + (p - p_o)h(\tau_0\cos\tau_0 - \sin\tau_0)$$ (Eqn. 18)

A less accurate but considerably simplified alternative to the equations above, is:

$$\left[-\frac{1}{2}fx - f\right]\begin{bmatrix}c\\\tau\end{bmatrix} = p - p_0\frac{fh}{x}$$ (Eqn. 19)

A minimum of two, but preferably more, matched pairs are needed to solve the least squares problem such that it has a unique solution, step 106. As is appreciated by those skilled in the art, matrix operations can be used to solve for the least squares problem above so that the sum of the squares of the errors is minimized. Furthermore, for good conditioning of the problem, it is desirable to have detected objects at ranges r which are as different as possible (objects at differing distances from the host vehicle) and which are not too close to zero (too close to the vehicle). It is also preferably that the quantity x (downrange distance to the object) be corrected before use in the equation above by accounting for the non-colocation of the radar and camera (i.e., the downrange distance should be relative to the camera).

The quantities estimated using the scheme described above, namely the curvature c and the instantaneous tilt angle $\tau$, can vary rapidly. On the other hand, the pan angle $\psi$ is assumed to be fairly constant. For this reason, the system does not need to constantly acquire measurements for the pan angle $\psi$. Also, a slowly varying estimate of nominal tilt angle can be used instead of the instantaneous value estimated above.

It is expected that the estimates obtained using the schemes above will be filtered, step 108, to obtain final estimates. For example, the tilt angle could possibly be filtered using a model of the vehicle suspension's pitch dynamics or by some other technique known in the art.

A last step 64, entitled double checking, represents operations such as making sure there are enough matched pairs to make an estimate, checking intermediate values (e.g., before performing an arcsine operation), etc.

It will thus be apparent that there has been provided in accordance with this invention a method for estimating unknown parameters (namely, pan angle, instantaneous tilt angle and road geometry) which achieves the aims and advantages specified herein. It will, of course, be understood that the forgoing description is of preferred exemplary embodiments of the invention and that the invention is not limited to the specific embodiments shown. Various changes and modifications will become apparent to those skilled in the art and all such changes and modifications are intended to be within the scope of this invention.

We claim:

1. A method for operating an object detection system to determine a location of an object, comprising the steps of:
   (a) generating a vision track from data provided by a camera, said vision track including data indicative of a locations of the object, wherein a pixel coordinate is generated for each object that is detected from an image;
   (b) generating a radar track from data provided by a radar sensor, said radar track including data indicative of the locations of the object, wherein a range and azimuth angle coordinate is generated for each detected object;
   (c) generating a matched pair indicative of the location of the object based upon the data from said vision and radar tracks;
   (d) using the matched pair, estimating a camera pan angle ($\psi$) and an instantaneous tilt angle ($\tau$) and road geometry, wherein said camera pan angle is defined as the horizontal angle between a camera boresight and a radar boresight, wherein said instantaneous tilt angle is a vertical misalignment between the camera boresight and the longitudinal axis of a planar ground patch under a vehicle, wherein said estimated camera pan angle, instantaneous tilt angle ($\tau$), and road geometry minimize the alignment error between said matched pair, wherein said estimated camera pan angle is used to correct or reprocess each radar track so that a set of pan angle corrected matched pairs, each having a correct pan angle, is generated, and wherein said estimated instantaneous tilt angle ($\tau$) and road geometry comprise linearizing at least one trigonometric equation about a nominal tilt angle ($\tau 0$) so that said trigonometric equation becomes a linear equation; and (e) determining the location of the object, said determining including identifying, locating or interpreting the object using the estimates of the pan angle ($\psi$) and the instantaneous tilt angle ($\tau$) and the road geometry, wherein the estimates are used to correct for alignment differences between the camera and the radar sensor while traveling a roadway, and thereby correct for position of the object errors in the vision track and the radar track.

2. The method of claim 1, wherein a vertical curvature (c) of an upcoming road segment represents said road geometry.

3. The method of claim 1, wherein said vision track is provided in terms of a two-dimensional Cartesian coordinate system (pixels (p, q)), and said radar track is provided in terms of a two-dimensional polar coordinate system (range and azimuth angle (R, $\theta$)).

4. The method of claim 1, wherein said pan angle ($\psi$) estimate is filtered with a low-pass filter to provide a filtered pan angle estimate.

5. The method of claim 1, wherein step (d) further includes solving an optimization problem that minimizes the 3-D world coordinate alignment error between said matched pair.

6. The method of claim 5, wherein step (d) further includes utilizing a least squares problem.

7. The method of claim 1, wherein step (d) further includes removing any negligible terms and manipulating said linear equation so that a single linear equation is provided for said matched pair.

8. The method of claim 1, wherein step (d) further includes using said estimated camera pan angle ($\psi$) and said radar track to provide a pan corrected matched pair having a radar track that has been generally corrected for errors attributable to a camera pan angle.

9. The method of claim 8, wherein step (d) further includes using said pan corrected matched pair to estimate an instantaneous tilt angle ($\tau$) and road geometry.

10. The method of claim 1, wherein the vehicle object detection system is a forward looking, radar-cued vision system.

11. A method for operating an object detection system to determine a location of an object, comprising the steps of:

(a) generating a vision track from data provided by a camera, said vision track including data indicative of a locations of the object, wherein a pixel coordinate is generated for each object that is detected from an image;

(b) generating a radar track from data provided by a radar sensor, said radar track including data indicative of the locations of the object, wherein a range and azimuth angle coordinate is generated for each detected object;

(c) generating a matched pair indicative of the location of the object based upon the data from said vision and radar tracks;

(d) estimating a camera pan angle ($\psi$) that best fits said matched pair, wherein said camera pan angle is defined as the horizontal angle between a camera boresight and a radar boresight, wherein said instantaneous tilt angle is a vertical misalignment between the camera boresight and the longitudinal axis of a planar ground patch under a vehicle, wherein said estimated camera pan angle, instantaneous tilt angle ($\tau$), and road geometry minimize the alignment error between said matched pair, wherein said estimated camera pan angle is used to correct or reprocess each radar track so that a set of pan angle corrected matched pairs, each having a correct pan angle, is generated;

(e) using said estimated camera pan angle ($\psi$) and said radar track to provide a pan corrected matched pair(s) having a radar track that has been generally corrected for errors attributable to a camera pan angle, wherein said estimates comprise linearizing at least one trigonometric equation about a nominal tilt angle ($\tau 0$) so that said trigonometric equation becomes a linear equation;

(f) using said pan corrected matched pair(s) to estimate an instantaneous tilt angle ($\tau$) and road geometry; and (g) determining the location of the object, said determining including identifying, locating or interpreting the object using the estimates of the pan angle ($\psi$) and the instantaneous tilt angle ($\tau$) and the road geometry, wherein the estimates are used to correct for alignment differences between the camera and the radar sensor while traveling a roadway, and thereby correct for position of the object errors in the vision track and the radar track.

12. A method for operating an object detection system to determine a location of one or more of a plurality of objects, comprising the steps of:

(a) generating a plurality of vision tracks from data provided by a camera, said vision tracks including data indicative of locations of the plurality of objects, wherein a pixel coordinate is generated for each object that is detected from an image;

(b) generating a plurality of radar tracks from data provided by a radar sensor, said radar tracks including data indicative of the locations of the plurality of objects, wherein a range and azimuth angle coordinate is generated for each detected object;

(c) generating a plurality of matched pairs indicative of the locations based upon the data from said vision and radar tracks;

(d) estimating a camera pan angle ($\psi$) that best fits said plurality of matched pairs, wherein said camera pan angle is defined as the horizontal angle between a camera boresight and a radar boresight, wherein said instantaneous tilt angle is a vertical misalignment between the camera boresight and the longitudinal axis of a planar ground patch under a vehicle, wherein said estimated camera pan angle, instantaneous tilt angle ($\tau$), and road geometry minimize the alignment error between said matched pair, wherein said estimated camera pan angle is used to correct or reprocess each radar track so that a set of pan angle corrected matched pairs, each having a correct pan angle, is generated, and wherein said estimated instantaneous tilt angle ($\tau$) and road geometry comprise linearizing at least one trigonometric equation about a nominal tilt angle ($\tau 0$) so that said trigonometric equation becomes a linear equation;

(e) using said estimated camera pan angle ($\psi$) and said plurality of radar tracks to provide a plurality of pan corrected matched pairs each having a radar track that has been generally corrected for errors attributable to a camera pan angle;

(f) using said plurality of pan corrected matched pairs to generate a least squares problem, said least squares problem treats said estimated camera pan angle ($\psi$) as zero;

(g) linearizing one or more trigonometric equations about a nominal tilt angle ($\tau 0$) so that said trigonometric equations become linear equations;

(h) solving said least squares problem to estimate both said instantaneous tilt angle ($\tau$) and said vertical curvature (c); and (i) determining the location of one or more of the objects, said determining including identifying, locating or interpreting objects using the estimates of the pan angle ($\psi$) and the instantaneous tilt angle ($\tau$) and the road geometry, wherein the estimates are used to correct for alignment differences between the camera and the radar sensor while traveling a roadway, and thereby correct for position of the object errors in the vision track and the radar track.

\* \* \* \* \*